United States Patent [19]

Haines et al.

[11] 4,067,113

[45] Jan. 10, 1978

[54] DIPSTICK WITH PRESSURE RELIEF VALVE

[75] Inventors: Walter E. Haines, Bloomfield Hills; Mason E. Richardson, Warren, both of Mich.

[73] Assignee: Estan Manufacturing Company, Troy, Mich.

[21] Appl. No.: 729,991

[22] Filed: Oct. 6, 1976

[51] Int. Cl.² .............................................. G01F 23/04
[52] U.S. Cl. ............................................... 33/126.7 R
[58] Field of Search ..................... 33/126.7 R, 126.4 R

[56] References Cited

U.S. PATENT DOCUMENTS

| 1,353,193 | 9/1920 | Townsend | 33/126.4 R X |
| 1,668,149 | 5/1928 | Hickman | 33/126.4 R X |
| 1,669,776 | 5/1928 | Osburn | 33/126.4 R |
| 2,333,711 | 11/1943 | Dwiggins | 33/126.4 R |
| 3,147,554 | 9/1964 | Beattie | 33/126.7 R |
| 3,377,708 | 4/1968 | Gassman et al. | 33/126.7 R |
| 3,991,476 | 11/1976 | Haines | 33/126.7 R |

Primary Examiner—Charles E. Phillips
Attorney, Agent, or Firm—McGlynn and Milton

[57] ABSTRACT

A dipstick assembly including a pressure relief valve comprising a handle member having a passageway extending therethrough between the ends thereof, a measuring blade connected to the handle member, a sealing device for perfecting a seal between the dipstick assembly and an access tube adapted to receive the assembly and a valve located within the passageway of the handle member for maintaining a predetermined pressure within a vessel to which the access tube is connected.

12 Claims, 3 Drawing Figures

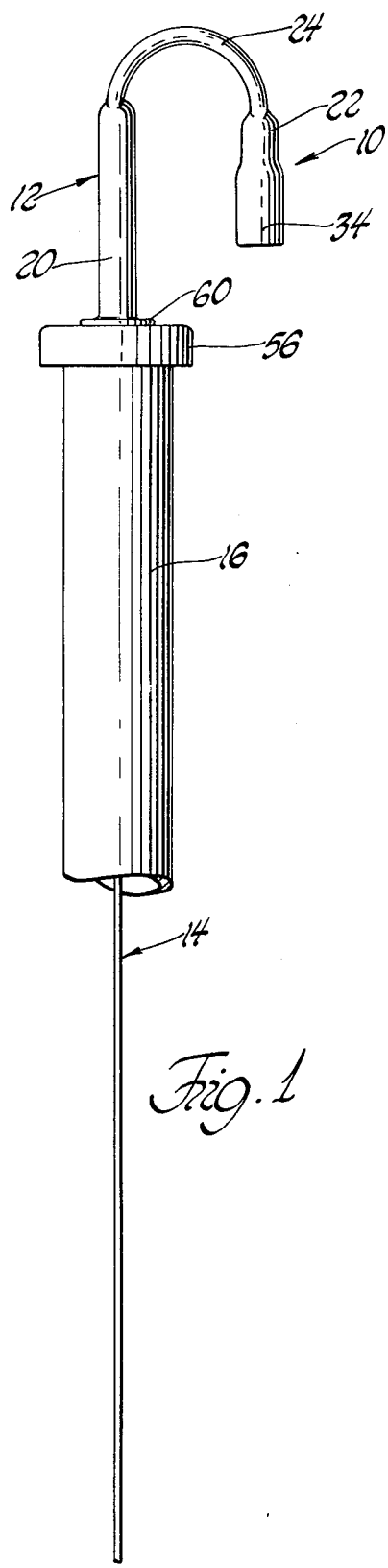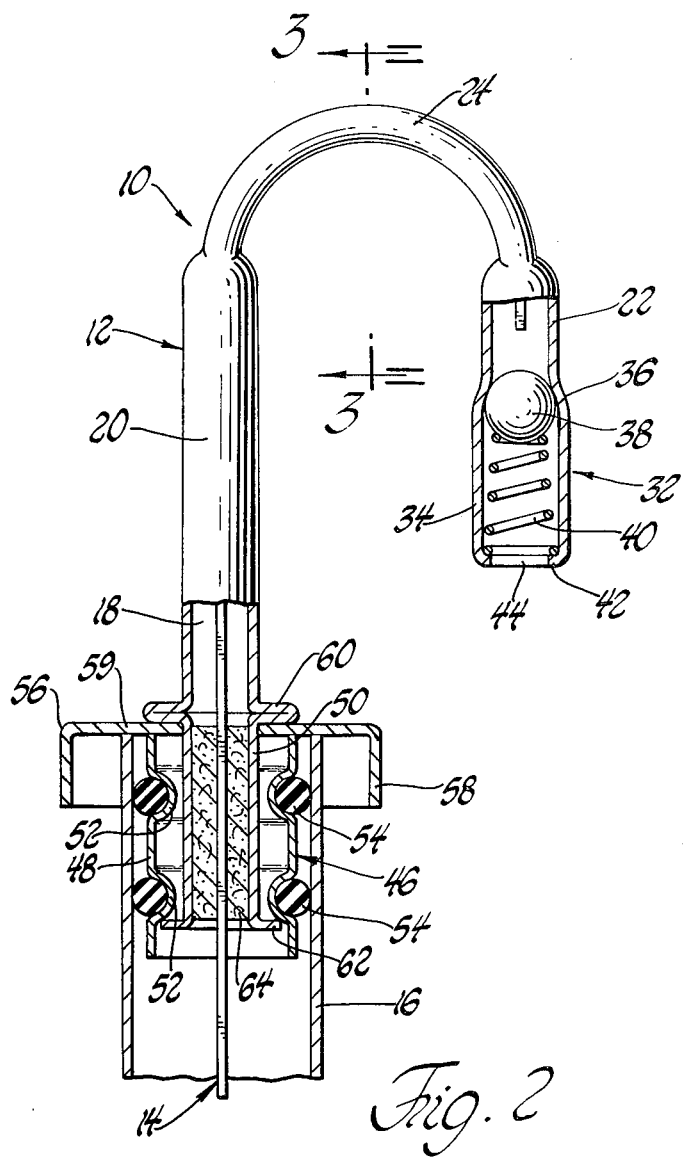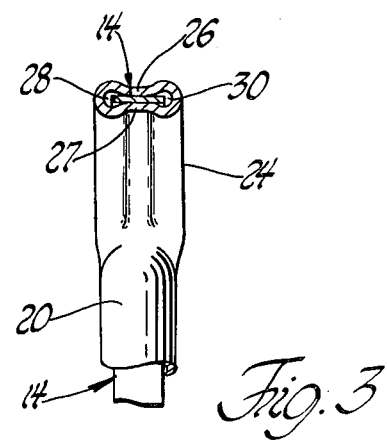

DIPSTICK WITH PRESSURE RELIEF VALVE

FIELD OF THE INVENTION

This invention relates to a dipstick assembly having a pressure relief valve for measuring the fluid level in a vessel and for maintaining a predetermined pressure level within the vessel. More specifically, the dipstick assembly is one which includes a pressure relief valve located in the handle portion thereof which is adapted for use with the transaxle of a vehicle in which it is desirable to maintain a predetermined pressure level.

BACKGROUND OF THE INVENTION

In many applications for dipsticks it is undesirable to maintain superatmospheric pressure within the vessel with which the dipstick assembly is associated. Therefore, in some cases, the dipstick assembly has simply been vented to permit escape of any pressure which might develop within the vessel. However, in some automotive applications it is desirable to produce superatmospheric pressure within the vessel to a predetermined level. This is the case, for example, in automobiles employing transaxles. Heretofore, it has been the practice to provide an access tube in the housing of the transaxle for receiving a dipstick assembly for measuring the level of fluid therein. Such dipstick assemblies normally included a sealing device for sealing the access tube when the dipstick assembly is in place to prevent escape of gas pressure through the access tube. A second opening is provided in the transaxle housing for receiving a pressure relief valve. The pressure relief valve normally closes the transaxle housing until the pressure within the transaxle housing reaches a predetermined level at which point the pressure relief valves permit the escape of the excess gas pressure. In this manner, a predetermined amount of gas pressure is maintained within the transaxle housing.

While the foregoing system operates satisfactorily, it is relatively expensive since two openings must be provided in the transaxle housing as well as two separate assemblies, that is, the dipstick assembly and the pressure relief valve assembly. The instant invention provides a dipstick assembly with an integral pressure relief valve thereby eliminating the need for a second opening in the transaxle housing and a separate pressure relief valve assembly.

BRIEF DESCRIPTION OF THE INVENTION

In accordance with the foregoing, the dipstick assembly of the instant invention includes a handle member having a passageway extending therethrough between the ends thereof. A measuring blade is connected to the handle member and is adapted to extend through the access tube of the vessel, in this case a transaxle, for measuring the fluid level within the vessel. Sealing means is provided for perfecting a seal between the dipstick assembly and the access tube to prevent inadvertent escape of gas pressure from the access tube. In order to effect controlled escape of gas pressure from the vessel through the access tube, valve means is located within the passageway of the handle member. Hence, the dipstick assembly is capable of carrying out not only its normal function of measuring the level of fluid within the vessel, but is also capable of controlling the escape of gas pressure therefrom.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is an elevational view of a dipstick assembly constructed in accordance with the instant invention located within an access tube;

FIG. 2 is an enlarged broken-away view, partially in cross section, showing the internal details of the dipstick assembly; and FIG. 3 is a cross-sectional view taken generally along line 3—3 of FIG. 2.

DETAILED DESCRIPTION OF THE INVENTION

Referring more particularly to the drawings, a dipstick assembly constructed in accordance with the instant invention is generally shown at 10.

The dipstick assembly 10 includes a handle member, generally indicated at 12, and a measuring blade, generally indicated at 14, which is connected to the handle member. The measuring blade 14 is an elongated strip, preferably made of spring steel, which is adapted to extend through an access tube 16 into a vessel for measuring the level of fluid contained therein. For this purpose, the measurng blade is provided with suitable indicia (not shown) on the end thereof defining a scale for indicating the fluid level.

The handle member 12 is tubular and, hence, includes a passageway 18 extending therethrough between the ends thereof. The purpose of the passageway, as will become more apparent herein, is to provide a route for the escape of excess gas pressure. The handle member 12 includes a first generally straight portion 20, a second generally straight portion 22 and an arcuate portion 24 between the first and second straight portions 20 and 22. The measuring blade 14 extends through at least the first straight portion 20 and the arcuate portion 24 to form a connection between the measuring blade 14 and the handle member 12.

In the actual assembly procedure, the handle member 12 begins as a straight tubular member. The measuring blade 14 is insered a predetermined distance into the straight tubular member and the tubular member is bent to produce the arcuate portion 24. Bending the tubular member traps the measuring blade 14 so that two parts cannot be separated. In some cases it is desirable to inwardly deform the arcuate portion 24 along the center line thereof as is shown in FIG. 3 at 26 and 27. The two flattened sections 26 and 27 engage and positively grip the measuring blade 14. As shown in FIG. 3, the entire arcuate portion 24 is not flattened. In other words, only the central portion of the arcuate portion 24 is flattened so that passageways 28 and 30 remain which flank the measuring blade 14.

While this procedure for securing the measuring blade 14 to the handle member 12 is desirable since it produces an excellent connection, it is not essential that the arcuate portion 24 be inwardly deformed as described. It has been found that merely bending the handle member 12 in a relatively tight radius is sufficient to secure the measuring blade 14 to the handle member 12. This is due to the fact that the measuring blade 14 is made of spring steel. Hence, the curved portion of the measuring blade 14 springs outwardly against the inward wall of the arcuate portion 24. This produces an adequate connection between the measuring blade 14 and the handle member 12. In some situations it may be more desirable to provide this type of connection thereby producing less of a restriction in the passageway 18 through the handle member 12.

In order to control the amount of pressure within the vessel, valve means, generally shown at 32, is located within the passageway 18 of the handle member 12. While it is possible to locate the valve means 32 anywhere along the passageway 18, a particularly convenient manner of manufacturing a combined dipstick assembly and pressure relief valve is shown in FIG. 2. More specifically, the second straight portion 22 includes a chamber 34 at the end thereof. The chamber 34 may be formed by expanding the end of the second straight portion 22. The increased diameter of the chamber 34 defines a constricted region, specifically a shoulder 36, between the chamber 34 and the remainder of the second straight portion 22. The shoulder 36 functions as a valve seat for the valve means 32. There are, however, other means for providing a constricted region to serve as a valve seat. A ball member 38, which comprises the valve body of the valve means 32, is located within the chamber 34 and is adapted to seat on the interior surface of the shoulder 36. As is apparent, the ball member 38 has a diameter which is larger than the diameter of the second straight portion 22 thereby effectively blocking the passageway 18 when the ball member 38 is seated on the shoulder 36. Spring means comprising a coil spring member 40 is also located within the chamber 34 for urging the ball member 38 against the shoulder 36.

In order to retain the elements of the valve means 32 within the chamber 34, the exit end of the chamber 34 includes an inwardly extending flange 42. The inwardly extending flange 42 provides a reaction surface for the spring member 40 and holds the spring member 40 within the chamber 34. The inwardly extending flange 42 is formed by bending the end of the chamber 34 inwardly. It is noted, however, that a central opening 44 remains to permit escape of excess gas pressure.

In order to control the amount of gas pressure within the vessel, it is necessary to seal the access tube 16 to prevent inadvertent escape of gas pressure. Hence, the dipstick assembly 10 includes sealing means, generally indicated at 46, which is supported by the first straight portion 20 of the handle member 12 for perfecting a seal between the dipstick assembly 10 and the access tube 16. The sealing means 46 includes a sealing sleeve 48 surrounding a portion 50 of the handle member 12. The sealing sleeve 48 has an outer diameter which is smaller than the inner diameter of the access tube. At least one annular groove 52, and preferably two annular grooves 52, are provided along the length of the sealing sleeve 48. These annular grooves 52 locate annular sealing rings which sealingly engage the acess tube 16. Preferably, the sealing rings 54 are made of rubber or some other heat and chemical resistant sealing material.

The dipstick assembly 10 may also include a cap member 56. The cap member 56 includes a skirt portion 58 which surrounds the exterior of the end of the access tube 16 and a top portion 59.

A unique and convenient manner for joining the cap member 56 and sealing sleeve 48 to the handle member 12 is disclosed and claimed in a co-pending patent application of the inventor herein, Ser. No. 621,371, filed Oct. 10, 1975 now U.S. Pat. No. 3,991,476. More specifically, the cap member includes an opening in the top portion 59 for receiving the end of the handle member 12. The handle member includes a radially outwardly extending projection or abutment 60 against which the exterior surface of the cap member 56 abuts. The sealing sleeve 48 engages the interior side of the cap member 56. In order to hold the sealing sleeve 48 against the cap member 56, the sealing sleeve 48 is in mechanical gripping engagement with a portion 50 of the handle member 12. Mechanical gripping engagement is established by providing a radially outwardly extending projection which consists of an outwardly flared flange 62 at the end of the straight portion 20 of the handle member 12. The outwardly flared flange 62 engages one of the annular grooves 52 thereby holding the sealing sleeve 48 against the cap member and preventing the sealing sleeve 48 from sliding off the end of the handle member 12. Both the first and second projections 60 and 62 are made by simple and well-known tub-working techniques. Hence, a very inexpensive and fast assembly operation is achieved.

While it is necessary, of course, to permit the passage of gases through the handle member 12 to relieve excess gas pressure, it is undesirable for fluids within the vessel to also escape. On occasion, due to fluctuations in gas pressure within the vessel, there is a tendency for the fluid to flow or surge up the access tube 16. In order to prevent, or at least reduce the chances of fluid escaping through the handle member 12, the handle member includes gas-permeable antisurge means 64 located in the passageway 18. As shown in FIG. 2, the antisurge means 64 is located at the lower end of the straight portion 20; however, it should be apparent that the antisurge means 64 may be located at other positions along the passageway 18. The antisurge means 64 preferably consists of a woven wire mass, such as steel wool, which permits the passage of gas therethrough but resists the flow of liquids, particularly liquids having relatively high viscosity, such as oil or transmission fluid.

From the foregoing description, the operation of the dipstick assembly should be apparent. More specifically, however, when the dipstick assembly is located within the access tube 16, the sealing means 46 effectively seals the end of the access tube 16. Hence, escaping gas must travel through the passageway 18 in the handle member 12. Under normal conditions, the gas pressure within the vessel will not be sufficient to unseat the ball member 38. However, when the force acting on the ball member 38 created by the gas pressure in the vessel exceeds the force of the spring 40, the ball member 38 will be unseated and gas will escape through the opening 44 until the gas pressure within the vessel is decreased sufficiently to balance the spring 40 thus causing the ball member 38 to reseat against the shoulder 36. In this manner, a predetermined maximum level of gas pressure can be maintained within the vessel.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that the invention may be practiced otherwise than as specifically described herein and yet remain within the scope of the appended claims.

The embodiments of the invention in which an exclusive property or privilege is claimed are defined as follows:

1. A dipstick assembly for measuring the fluid level within a sealed chamber, such as a vehicle transaxle, wherein the dipstick is removably received within an access tube, said dipstick assembly comprising:
   a handle member having a passageway extending therethrough between the ends thereof for establishing communication between the interior and exterior of the access tube,
   a measuring blade connected to said handle member,
   sealing means supported by said handle member for perfecting a seal between said assembly and the interior of the access tube when said dipstick assembly is inserted therein, and
   one-way check valve means located within said passageway of said handle member for automatically releasing pressure within the chamber when the pressure exceeds a predetermined maximum.

2. An assembly as set forth in claim 1 wherein said valve means includes a valve seat, a valve body, and spring means for urging said valve body toward said valve seat.

3. An assembly as set forth in claim 2 wherein said handle member includes a constricted region for defining said valve seat.

4. An assembly as set forth in claim 3 wherein said valve body includes a ball member having a diameter at least slightly larger than the diameter of said constricted region.

5. An assembly as set forth in claim 1 wherein said sealing means includes a sealing sleeve surrounding a portion of said handle member having an outer diameter smaller than the inner diameter of the access tube, said sealing sleeve including at least one annular groove and an annular sealing ring seated in said groove for sealingly engaging the access tube.

6. An assembly as set forth in claim 5 including a cap member, said cap member having an opening for receiving said handle member, said handle member including a radially outwardly extending projection against which one side of said cap member abuts, said sealing sleeve abutting the other side of said cap member and said handle member further including a second radially outwardly extending projection engaging one of said annular grooves for holding said sealing sleeve against said cap member.

7. An assembly as set forth in claim 6 wherein said second radially outwardly extending projection comprises an outwardly flared flange at the end of said handle member.

8. An assembly as set forth in claim 1 wherein said handle member includes gas permeable antisurge means located in said passageway for resisting the flow of liquids therethrough.

9. An assembly as set forth in claim 1 wherein said handle member includes a first straight portion for supporting said sealing means, a second straight portion for containing said valve means and an arcuate portion between said first and second straight portions, said measuring blade extending through said first straight portion and said arcuate portion to connect said measuring blade to said handle member.

10. An assembly as set forth in claim 9 wherein the walls of said arcuate portion are inwardly deformed to grip said measuring blade, said arcuate portion including passageways flanking said measuring blade.

11. An assembly as set forth in claim 9 including a chamber at the end of said second straight portion having an increased diameter thereby defining a shoulder, a ball member located within said chamber for seating on said shoulder, and a spring member for urging said ball member against said shoulder.

12. An assembly as set forth in claim 11 wherein said chamber includes an exit end having an inwardly extending flange for retaining said spring member and ball member.

* * * * *